United States Patent [19]
Patterson et al.

[11] Patent Number: 5,228,531
[45] Date of Patent: Jul. 20, 1993

[54] BATTERY HOLD-DOWN MECHANISM

[75] Inventors: Jon M. Patterson, Wauwatosa; Richard D. Teal, Horicon; Wayne R. Hutchison, Mayville, all of Wis.; Steven C. Wasson, Midland, Mich.; James H. Weitz, Ridgewood, N.J.; Daniel R. Nickles, Monroe, N.Y.

[73] Assignee: Deere & Company, Moline, Ill.

[21] Appl. No.: 715,533

[22] Filed: Jun. 14, 1991

[51] Int. Cl.$^5$ ............................................. B62D 25/00
[52] U.S. Cl. .................................................... 180/68.5
[58] Field of Search ...................... 180/68.5, 65.1, 907, 180/908; 296/37.1; 248/503

[56] References Cited

U.S. PATENT DOCUMENTS

| | | | |
|---|---|---|---|
| 3,437,165 | 4/1969 | Hungerford | 180/68.5 |
| 3,989,118 | 11/1976 | Hansen | 180/68.5 |
| 4,682,751 | 7/1987 | Tamas | 248/503 |
| 4,696,508 | 9/1987 | Brautigam | 296/65 R |
| 4,723,618 | 2/1988 | Coonradt | 180/68.5 |
| 4,779,692 | 10/1988 | Hagerty et al. | 180/68.5 |
| 4,785,900 | 11/1988 | Nasky | 180/89.14 |
| 4,930,300 | 6/1990 | Benter et al. | 56/16.7 |
| 4,976,327 | 12/1990 | Abujudom, II et al. | 180/68.5 |

FOREIGN PATENT DOCUMENTS 600118 11/1929 Fed. Rep. of Germany ..... 180/68.5

OTHER PUBLICATIONS

John Deere Horicon Works entitled "STX30 and STX38 Lawn Tractors Operator's Manual", front cover and p. 38, published in Jul. 1988.

John Deere Horicon Works entitled "170, 175, 180 and 185 Lawn Tractors Operator's Manual", front cover and p. 42, published in Jul. 1987.

Primary Examiner—Richard M. Camby

[57] ABSTRACT

A mechanism usable with a vehicle having a compartment for carrying a battery. The mechanism includes a cover shiftable in a first direction for generally enclosing the compartment. The cover includes latching member for securing the cover in a compartment enclosing position, and also includes an abutment structure for abutting the battery as the cover shifts in the first direction to enclose the compartment. The cover can be deflected further in the first direction to become latched in the compartment enclosing position with the battery in abutment with the abutment member. The latched and deflected cover acts to resiliently bias and press the battery into secure fixed position within the compartment.

27 Claims, 4 Drawing Sheets

BATTERY HOLD-DOWN MECHANISM

BACKGROUND OF THE INVENTION

1. Field of the Invention

The invention relates to mechanisms for securing a battery within a vehicle compartment.

2. Description of the Related Art

Engine powered vehicles are typically provided with an electric battery for starting the engine. Typically, these batteries are carried within the hood of the vehicle, or within some other compartment in order to protect the battery from being damaged by exposure to the elements. A hood, or some other compartment cover or door is typically included for covering or enclosing the compartment to thereby isolate the contents of the compartment from the environment. If the battery is not snugly secured or fixed within the enclosure, the battery may rattle loosely within the compartment. An undesirable amount of noise may be created by the rattling battery during vehicle operation. Also, the shifting of the battery within the enclosure may damage the battery or shorten battery life.

Other vehicles provide mechanisms for securing the battery within the vehicle so that the battery is fixed snugly in place. It is known to use a clamp mechanism to hold the battery securely in place within the enclosure. These holding mechanisms increase the cost of the vehicle since they include a relatively large number of parts that must be attached to the vehicle frame. Tools are often required to remove the battery from these mechanisms, thereby increasing the difficulty involved in removing the battery.

Therefore, it would be desirable to provide a mechanism for holding a vehicle battery snugly within a covered enclosure during operation. It would be desirable to provide a mechanism having relatively few parts such that the cost to manufacture and attach the mechanism to a vehicle is reduced. It would be desirable to provide a battery securing mechanism that resiliently biases the battery to snugly maintain its position within the vehicle enclosure. It would be desirable for such a battery securing mechanism to allow the removal of the battery without requiring the use of tools.

SUMMARY OF THE INVENTION

A mechanism usable with a vehicle having a compartment that carries a battery. A cover is carried by the vehicle and is shiftable in a first direction to generally enclose the compartment. The cover includes a latch mechanism for releasably securing the cover in a compartment enclosing position. The cover has first, second and third positions. In the first position, the cover is open to allow access to the compartment and battery. In the second position, the cover is shifted in a first direction from the first position to generally enclose the compartment without being latched. While in the second position a portion of the cover is in abutment with the battery. In the third position, a portion of the cover is deflected further in the first direction from the second position while a portion of the cover remains in abutment with the battery. The deflection of the cover allows part of the cover to shift in the first direction to become latched with the vehicle in a compartment enclosing position. The deflection of the cover also resiliently presses and biases the battery into secured and snug abutment with the compartment. The preferred embodiment of the present invention provides a cover made of a resilient plastic material, and includes a pair of tabs that shift as the cover deflects. The deflection or bowing of the cover allows the tabs to shift to become received by openings formed in the vehicle. The cover thereby becomes latched as the cover deflects to the third position.

DESCRIPTION OF THE PREFERRED EMBODIMENT

Figure 1:
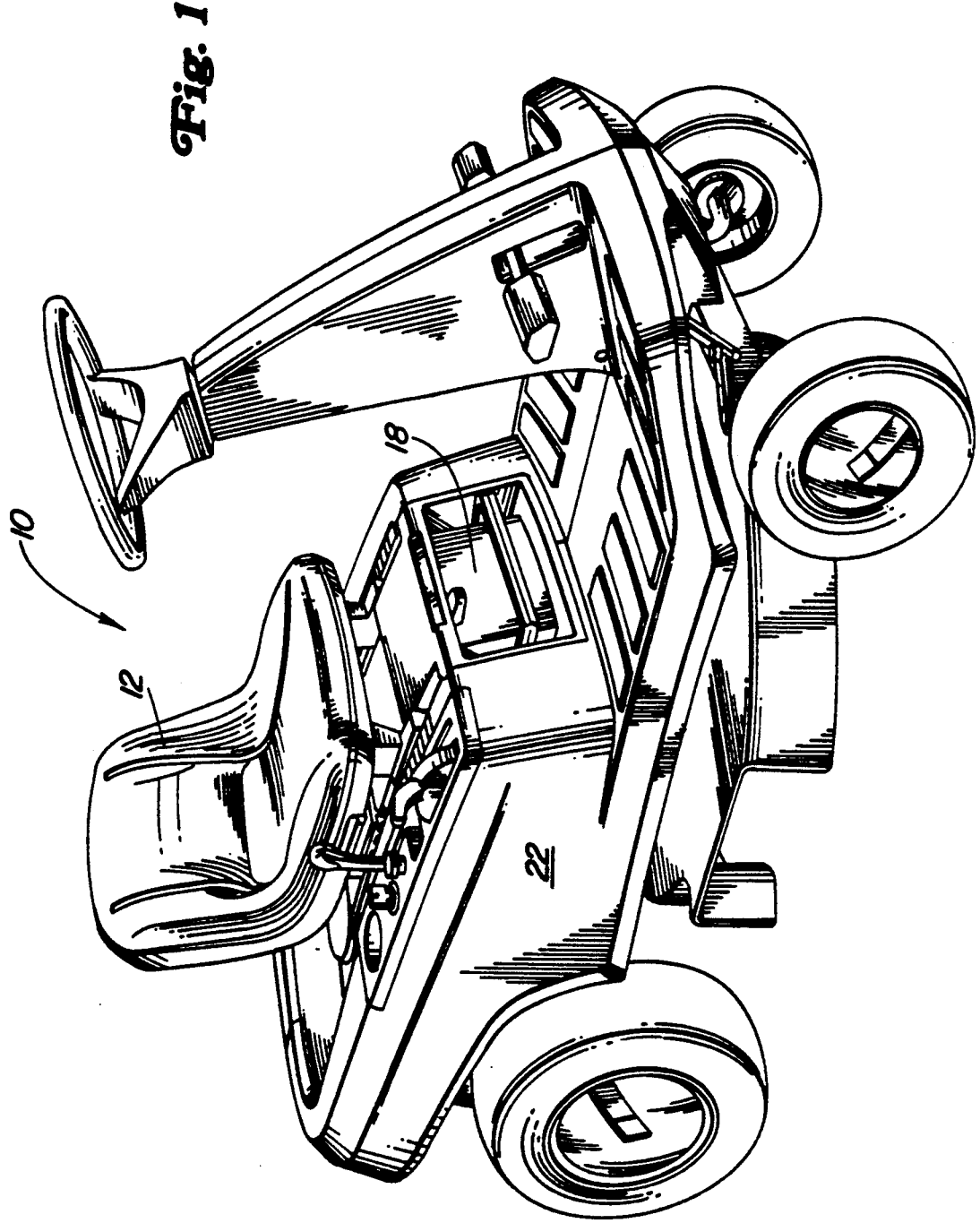
FIG. 1 shows a vehicle including the preferred embodiment of the present invention.
Figure 2:
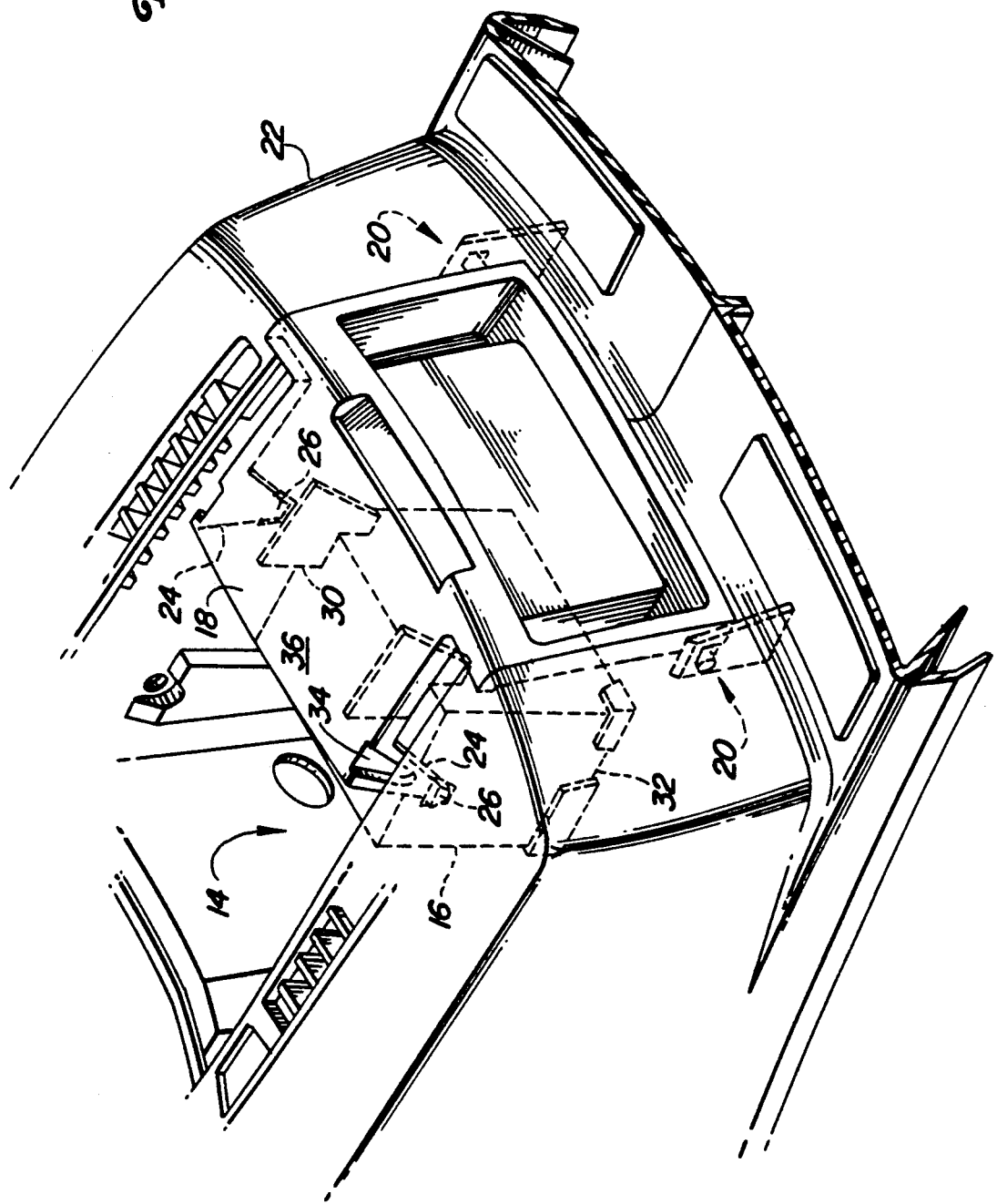
FIG. 2 shows the battery cover in its third or latched position.
Figure 3:
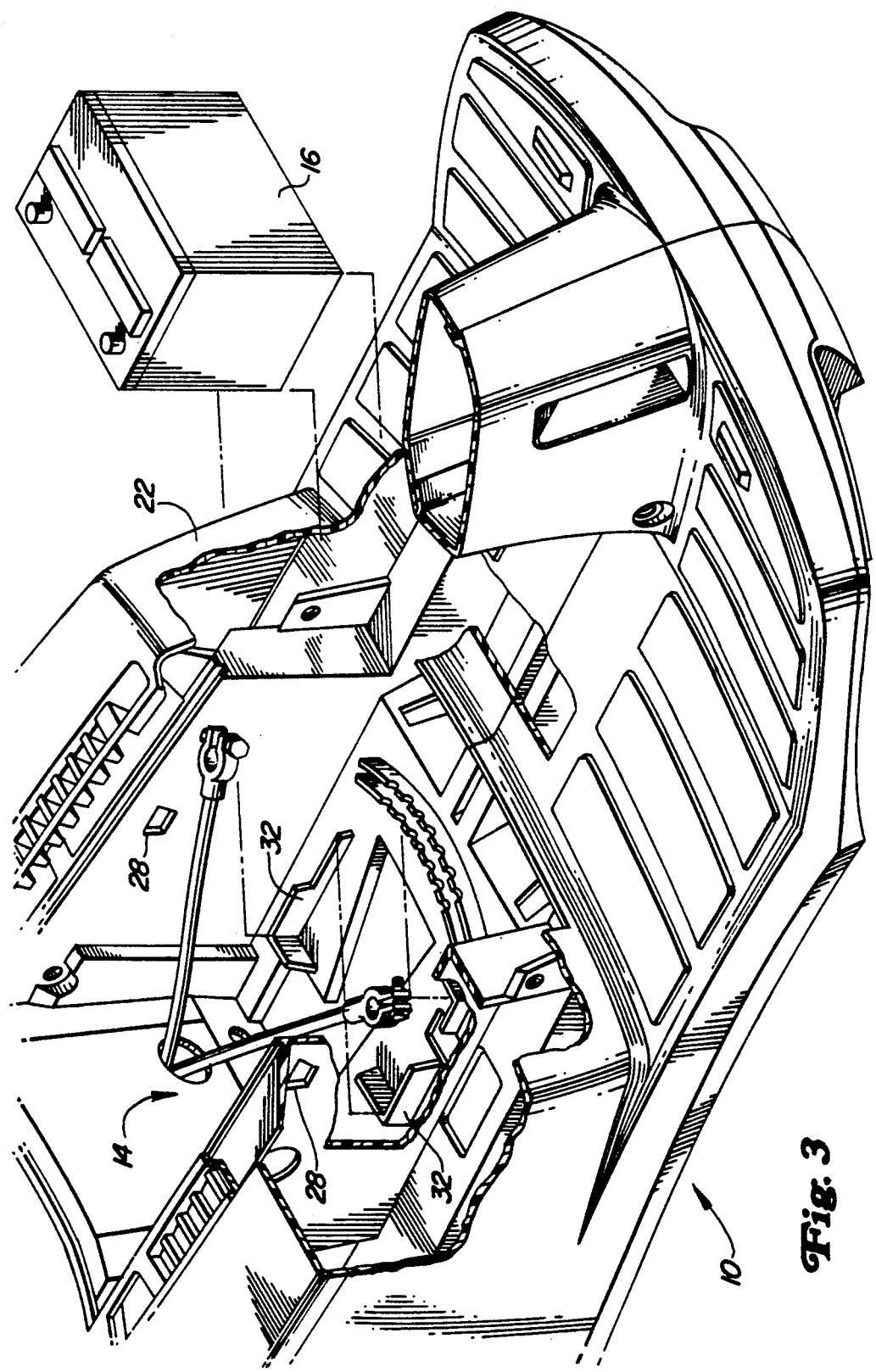
FIG. 3 is a perspective view of the preferred embodiment with the battery removed from the battery compartment for clarity.
Figure 4:
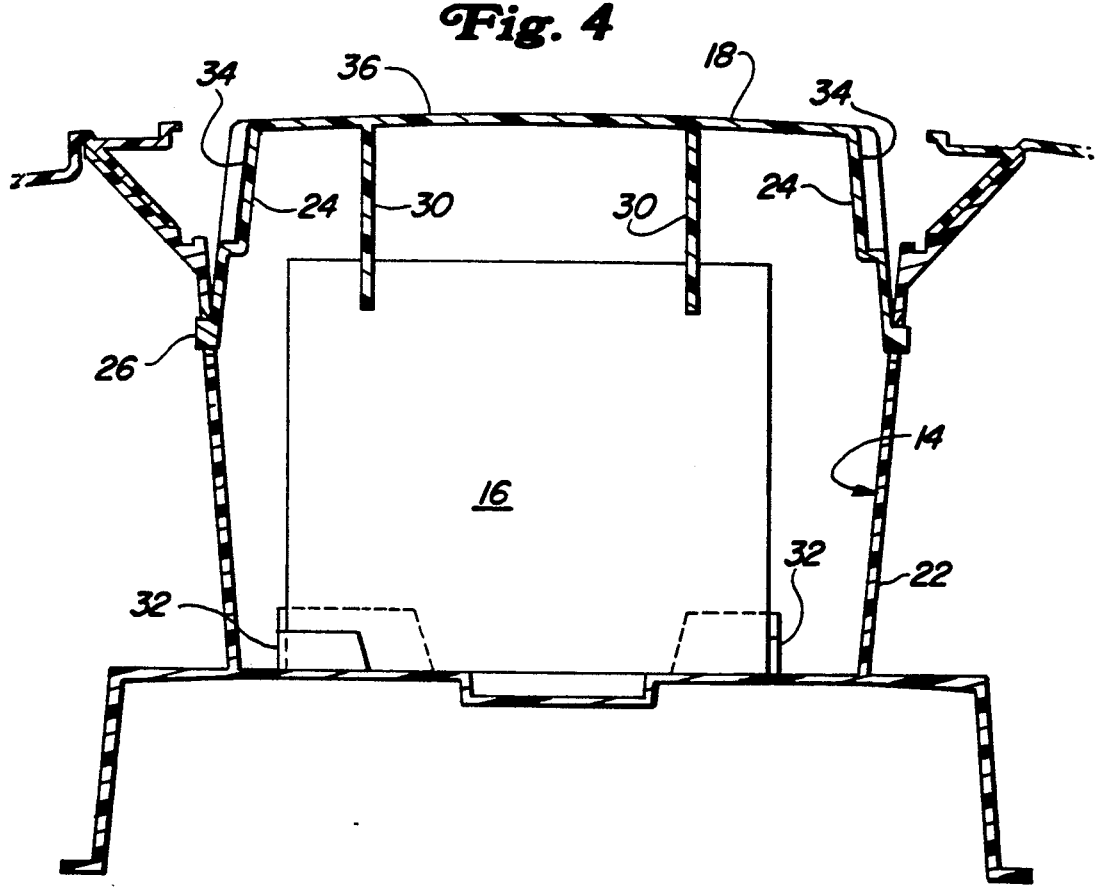
FIG. 4 is a sectional view from the rear showing the battery cover in its third or latched position.

Referring now to FIG. 1, there is shown a powered vehicle 10 provided with the preferred embodiment of the present invention. A seat 12 is carried by the vehicle to support an operator during vehicle operation. A compartment 14, as best seen in FIGS. 2–4, is formed beneath the seat 12 for housing vehicle components such as the vehicle's battery 16. A battery compartment cover 18 made of a resilient plastic material is pivotally carried beneath the seat 12, and acts to cover or enclose the compartment 14 and its contents.

Referring now to FIG. 2, there is shown in more detail the cover 18 and the battery 16 within the compartment 14. A pivot mechanism 20 couples the cover 18 with the vehicle frame 22. The cover 18 also includes a pair of tabs 24 on opposite sides of the rear of the cover 18. Hooks 26 are formed in the lower portions of the tabs 24. Slots or openings 28 are formed in the side walls of the compartment 14, and receive the hooked portions 26 of the tabs 24 for latching or securing the cover in a closed position. According to the preferred embodiment ribs 30 are formed integral with the cover 18 and between the tabs 24. The ribs 30 abut the battery 16 when the cover 18 is in a closed position. Upstanding ridges or vertically extending surface 32 are formed in the or horizontally extending surface floor of the compartment 14 and maintain the battery 16 in place when the ribs 30 press downwardly against the battery 16. Finger recesses 34 are formed in the tabs 24 and can be pressed by the fingers of the operator to shift the tabs 24 into and out of the openings 28.

Next, the operation of the preferred embodiment will be discussed. The cover 18 is shiftable between first, second and third positions. In the first position the cover 18 is pivoted forwardly to expose the interior of the battery compartment 14 and its contents. In this position, the operator has access to the compartment 14 and battery 16. The battery 16 can be serviced within the compartment 14 or removed. To close the cover 18, the operator pivots the cover 18 rearwardly about the pivot mechanism 20 to the second position whereat the ribs 30 are in contact with the battery 16. In the second position the hooked portions 26 of the tabs 24 are not yet received within the openings 28. To secure or latch the cover 18 in its closed mode, the operator engages the finger recesses 34 and presses downwardly on the tabs 24. The top portion 36 of the cover 18 that is between the tabs 24 will begin to bow or bend around the battery 16 in response to the force applied by the operator. The bowing allows the tabs 24 and hooked portions 26 to shift downwardly to a point where they can be received by the openings 28. The tabs 24 are biased outwardly by the material of the cover 18 and will snap into place within the openings 28 when they have shifted downwardly a sufficient amount. The cover 18 is in its third position when the hooked portions 26 of the tabs 24 are received by the openings 28.

When the cover 18 is in its third position, the top portion 36 of the cover 18 that is positioned between the tabs 24 flexes or deflects. The flexing allows the hooks 26 located at each side of the cover 18 to shift downwardly a sufficient amount to enter the openings 28. When in the third mode, the ribs 30 are pressing downwardly and rearwardly on the battery 16. The ribs 30 press the battery 16 against the rear upstanding ridge 32 formed in the compartment floor. The flexing of the cover 18 causes the ribs 30 to constantly and snugly secure the battery 16 in position. Therefore, the resilient material of the cover 18 acts as a biasing mechanism for constantly pressing the battery 16 into secure position against the upstanding ridges 32, and the battery 16 remains snugly carried within the compartment 14. Since the material of the cover 18 acts as a biasing mechanism, the need for a separate structure to press against the battery 16 is eliminated, and the cost of the entire mechanism is reduced.

To open the cover 18, the operator presses the finger recesses 34 of the tabs 24 inwardly toward each other. As the hook portions 26 shift out of the openings 28, the resilient cover 18 will snap back toward its undeflected position, thereby shifting the tabs 24 upwardly. The hooked portions 26 shift upwardly and become misaligned with the openings 28 when the cover 18 springs back to the undeflected position. The cover 18 can then be pivoted upwardly and forwardly to open the compartment to allow the operator access to the battery 16. Once the cover 18 has been opened and the battery cables have been removed, the operator can then lift the battery 16 from the compartment 14 without the use of tools.

Since the material of the cover 18 resiliently biases the battery 16 into fixed securement within the compartment 14, bolts or other fastening devices that may become loosened during operation are eliminated. The battery 16 therefore remains snugly fixed as long as the cover 18 is latched. The resiliency of the cover 18 also allows batteries of slightly different sizes to be utilized and still be held snugly within the compartment 14.

I claim:

1. A mechanism usable with a vehicle having a compartment for carrying a battery said mechanism comprising:
   a cover shiftable in a first direction to generally enclose the compartment, said cover having latching mans including at least one tab portion formed integral with the cover and abuttable with a portion of the vehicle for securing the cover in a compartment enclosing position when the cover is in attached mode, said cover also including means for abutting the battery as the cove shifts in the first direction to enclose the compartment, said cover being deflectable further in the first direction for becoming latched in the compartment enclosing position with the battery in abutment with the abutment means such that said deflection of the cover acts to resiliently bias and press the battery into secure position within the compartment, and when the cover is in the latched mode said deflection of said cover acts to resiliently bias the tab portion into abutment with said portion of the vehicle.

2. The invention of claim 1, wherein the cover is a resilient plastic material.

3. The invention of claim 1, and further including a pivot means coupled between the cover and the vehicle for allowing the cover to pivot in the first direction to assume the compartment enclosing position.

4. The invention of claim 1, and further comprising:
   at least one opening formed be the vehicle for receiving the tab and latching the cover in a compartment enclosing position.

5. The invention of claim 1, wherein:
   a pair of tabs are carried by the cover for pivotal motion therewith, and on opposite sides of the battery,
   a pair of openings are defined by the vehicle on opposite sides of the battery for receiving the tabs,
   said abutment means are carried by the cover generally between the tabs,
   said tabs are pressable by an operator to deflect the portion of the cover located between the tabs for allowing the tabs to become aligned with the openings, deflection of said cover also acting to resiliently bias the tabs into the openings for securing the cover in a compartment enclosing position, said deflection also acting to bias the abutment means against the battery for securing the battery within the compartment.

6. A mechanism usable with a vehicle having a compartment, said mechanism comprising:
   a battery positioned with the compartment,
   a pivot means carried by the vehicle,
   a cover carried by the pivot means for pivoting in a first direction to generally enclose and cover the compartment and battery,
   abutment means carried by the cover for abutting the battery as the cover shifts in the first direction to cover the compartment,
   at least one tab carried by the cover for pivotal motion therewith,
   at least one opening formed by the vehicle for receiving the tab and latching the cover in a compartment enclosing position,
   said cover being deflectable further in the first direction once the battery is in abutment with the abutment means, deflection of said cover allowing the tab to become aligned with the opening for latching the cover in a compartment enclosing position with the battery in abutment with the abutment means, said latched and deflected cove acting to resiliently bias the abutment means to press the battery into secure position within the compartment, said deflection of the cover also acting to resiliently bias the tab into the opening.

7. A mechanism usable with a vehicle having a compartment, said mechanism comprising:
   a battery positioned within the compartment,
   a pivot means carried by the vehicle,
   a cover carried by the pivot means for pivoting in a first direction to generally enclose and cover the compartment and battery,
   a pair of tabs carried by the cover for pivotal motion therewith, and on opposite sides of the battery, a pair of openings formed by the vehicle for receiving the tabs and latching the cover in a compartment enclosing position, abutting means carried by the cover for abutting the battery as the cover shifts in the first direction to cover the compartment, a deflecting portion formed in the cover generally between the two tabs for deflecting further in the first direction once the battery is in abutment with the abutment means, said tabs being shifted into alignment with the openings for latching the cover when the deflecting portion of the cover deflects, said deflected cover acting to resiliently bias the tabs into the openings, said deflected cover acting to bias the abutment means to press the battery into secure position within the compartment.

8. A mechanism usable with a vehicle having a compartment for carrying a battery, said mechanism comprising:

a resilient cover having abutment means for abutting the battery, said cover including at least one tab portion formed integral therewith and having a latched mode wherein the tab portion abuts a portion of the vehicle for securing the cover in a compartment enclosing position, said cover having a first position wherein the cover allows access to the compartment, a second position wherein the abutment means is in abutment with the battery, and a third position wherein the abutment means is in abutment with the battery and a portion of the cover is deflected, and said deflection of said cover resiliently biases the tab portion into a position whereat the tab abuts with said portion of the vehicle, said deflected portion of the cover also resiliently biasing the abutment means to press the battery into secure position within the compartment when the cover is in the third position.

9. A mechanism usable with a vehicle having a compartment, said mechanism comprising:

a battery positioned within the compartment, a cover shiftable in a first direction to generally enclose the compartment, said cover including at east one tab portion for pitvotal motion therewith, said tab portion being abuttable with a portion of the vehicle for releasably securing the cover in a compartment enclosing position, said cover having
a first position whereat the cover is open to allow access to the compartment,
a second position whereat the cover is shifted in the first direction from the first position to generally enclose the compartment without being latched, a portion of said cover also being in abutment with the battery when in the second position,
a third position whereat a portion of the cover is deflected further in the first direction from the second position with the cover remaining in abutment with the battery, said deflection resiliently biasing the tab to shift to a position whereat the tab abuts said portion of the vehicle for becoming latched in a compartment enclosing position, said deflection also resiliently biasing the battery into snug abutment with the compartment.

10. The invention of claim 9, wherein the cover is a resilient plastic material.

11. The invention of claim 9, and further including a pivot means coupled between the cover and the vehicle for allowing the cover to pivot in the first direction to assume the compartment enclosing position.

12. The invention of claim 9, and further comprising:
at least one opening formed by the vehicle for receiving the tab for latching the cover in a compartment enclosing position.

13. The invention of claim 9, wherein:
a pair of tabs are carried by the cover on opposite sides of the battery,
a pair of openings are defined by the vehicle on opposite sides of the battery for receiving the tabs for latching the cover in a compartment enclosing position,
said abutment means are carried by the cover generally between the tabs,
said tabs are pressable by an operator to deflect the portion of the cover located between the tabs for allowing the tabs to enter the openings and thereby secure the cover in a compartment enclosing position with the battery in abutment with the abutment means, said deflected portion of the cover resiliently biasing and pressing the battery securely within the compartment.

14. The invention of claim 1, wherein the abutment means is coupled with the cover and urges the battery horizontally against a vertically extending surface, and also urges the battery vertically against a horizontally extending surface for securely carrying the battery within the compartment.

15. A mechanism usable with a vehicle having a compartment for carrying a battery, said mechanism comprising:

a cover shiftable in a first direction to generally enclose the compartment, said cover including at least one tab portion abuttable with a portion of the vehicle for securing the cover in a compartment enclosing position, said cover also including means for abutting the battery as the cover shifts in the first direction to enclose the compartment, said cover being deflectable further in the first direction for resiliently biasing the tab to shift to a position whereat the tab abuts with said portion of the vehicle for becoming latched in the compartment enclosing position with the battery in abutment with the abutment means, said abutment means and deflected cover acting to resiliently bias and press the battery horizontally against a vertically extending surface, and vertically against a horizontally extending surface for securely positioning the battery within the compartment.

16. The invention of claim 4, wherein the cover remains deflected when the tab is received in the opening, said deflection of the cover acting to resiliently bias the abutment means against the battery, and resiliently biases the tab into the opening.

17. A mechanism usable with a vehicle having a compartment for carrying a battery, said mechanism comprising:

a cover shiftable in a first direction to generally enclose the compartment, said cover including latching means for securing the cover in a compartment enclosing position, wherein the latch means further includes at least one tab carried by the cover, and at least one opening formed by the vehicle for receiving the tab and latching the cover in a compartment enclosing position, said cover also including means for abutting the battery as the cover shifts in the first direction, said cover being deflectable further in the first direction for becoming latched in the compartment enclosing position with the battery in abutment with the abutment means, said latched and deflected cover acting to resiliently bias and press the battery into secure position within the compartment, and wherein the cover remains deflected when the tab is received in the opening, said deflection of the cover acting to resiliently bias the abutment means against the battery, and resiliently biases the tab into the opening.

18. The invention of claim 4, wherein the cover, abutment means and tabs are formed integral with one another.

19. The invention of claim 5, wherein the cover, abutment means and tabs are formed integral with one another.

20. The invention of claim 7, wherein the cover, abutment means and tabs are formed integral with one another.

21. The invention of claim 13, wherein the cover, abutment means and tabs are formed integral with one another.

22. A mechanism usable with a vehicle having a compartment capable of carrying a battery, said mechanism comprising:
a cover means shiftable in a first direction to generally enclose the compartment, said cover means including at least one tab abuttable with a portion of the vehicle for securing the cover in a compartment enclosing position, said cover means having a latched mode, said cover means also including restricting means capable of restricting movement of the battery when in a compartment enclosing position, said cover means being deflectable for becoming latched in the compartment enclosing position, deflection of said cover means acting to resiliently bias the tab to a position whereat the tab abuts said portion of the vehicle.

23. A mechanism usable with a vehicle having a compartment for carrying a battery, said mechanism comprising:
a cover shiftable in a first direction to generally enclose the compartment, said cover including latching means for securing the cover in a compartment enclosing position, said latch means having a latched mode, said cover also including means for abutting the battery as the cover shifts in the first direction to enclose the compartment, said cover being deflectable further in the first direction for becoming latched in the compartment enclosing position with the battery in abutment with the abutment means, said deflected cover acting to resiliently bias and press the battery into secure position within the compartment, deflection of said cover also acting to resiliently bias the latch means to a latched mode,
a pair of tabs carried by the cover for pivotal motion therewith on opposite sides of the battery,
a pair of openings defined by the vehicle on opposite sides of the battery for receiving the tabs,
said abutment means are carried by the cover generally between the tabs,
said tabs being pressable by an operator to deflect the portion of the cover located between the tabs for allowing the tabs to become aligned with the openings, deflection of said cover also acting to resiliently bias the tabs into the openings for securing the cover in a compartment enclosing position, said deflection also acting to bias the abutment means against the battery for securing the battery within the compartment.

24. A mechanism usable with a vehicle having a compartment, with mechanism comprising:
a battery positioned within the compartment,
a cover shiftable in a first direction to generally enclose the compartment, said cover including latch means for releasably securing the cover in a compartment enclosing position, said cover having
a first position whereat the cover is open to allow access to the compartment,
a second position whereat the cover is shifted in the first direction from the first position to generally enclose the compartment without being latched, a portion of said cover also being in abutment with the battery when in the second position,
a third position whereat a portion of the cover is deflected further in the first direction from the second position with the cover remaining in abutment with the battery, said deflection allowing the cover to become latched in a compartment enclosing position and to resiliently bias the battery into snug abutment with the compartment,
a pair of tabs carried by the cover on opposite sides of the battery,
a pair of openings defined by the vehicle on opposite sides of the battery for receiving the tabs for latching the cover in a compartment enclosing position,
said abutment means being carried by the cover generally between the tabs,
said tabs are pressable by an operator to deflect the portion of the cover located between the tabs for allowing the tabs to enter the openings and thereby secure the cover in a compartment enclosing position with the battery in abutment with the abutment means, said deflected portion of the cover resiliently biasing and pressing the battery securely within the compartment.

25. A mechanism usable with a vehicle having a compartment for carrying a battery, said mechanism comprising:
a cover shiftable in a first direction to generally enclose the compartment, said cover including latching means for securing the cover in a compartment enclosing position, said latch means having a latched mode, said cover also including means for abutting the battery as the cover shifts in the first direction to enclose the compartment, said cover being deflectable further in the first direction for becoming latched in the compartment enclosing position with the battery in abutment with the abutment means, said deflected cover acting to resiliently bias and press the battery into secure position within the compartment, deflection of said cover also acting to resiliently bias the latch means to a latched mode,
said latch means further comprising:
at least one tab carried by the cover, and
at least one opening formed by the vehicle for receiving the tab and latching the cover in a compartment enclosing position, and
wherein the cover, abutment means and tabs are formed integral with one another.

26. A mechanism usable with a vehicle having a compartment for carrying a battery, said mechanism comprising:

a cover shiftable in a first direction to generally enclose the compartment, said cover including latching means for securing the cover in a compartment enclosing position said latch means having a latched mode, said cover also including means for abutting the battery as the cover shifts in the first direction to enclose the compartment, said cover being deflectable further in the first direction for becoming latched in the compartment enclosing position with the battery in abutment with the abutment means, said deflected cover acting to resiliently bias and press the battery into secure position within the compartment, deflection of said cover also acting to resiliently bias the latch means to a latched mode, a pair of tabs carried by the cover for pivotal motion therewtih, and on opposite sides of the battery, a pair of openings defined by the vehicle on opposite sides of the battery for receiving the tabs, said abutment means carried by the cover generally between the tabs, said tabs are pressable by an operator to deflect the portion of the cover located between the tabs for allowing the tabs to become aligned with the openings, deflection of said cover also acting to resiliently bias the tabs into the openings for securing the cover in a compartment enclosing position, said deflection also acting to bias the abutment means against the battery for securing the battery within the compartment, and wherein said cover, abutment means and tabs are formed integral with one another.

27. A mechanism usable with a vehicle having a compartment, said mechanism comprising:

a battery positioned within the compartment, a cover shiftable in a first direction to generally enclose the compartment, said cover including latch means for releasably securing the cover in a compartment enclosing position, said cover having a first position whereat the cover is open to allow access to the compartment, a second position whereat the cover is shifted in the first direction from the first position to generally enclose the compartment without being latched, a portion of said cover also being in abutment with the battery when in the second position, a third position whereat a portion of the cover is deflected further in the first direction from the second position with the cover remaining in abutment with the battery, said deflection allowing the cover to become latched in a compartment enclosing position and to resiliently bias the battery into snug abutment with the compartment, a pair of tabs carried by the cover on opposite sides of the battery, a pair of openings defined by the vehicle on opposite sides of the battery for receiving the tabs for latching the cover in a compartment enclosing position, said abutment means being carried by the cover generally between the tabs, said tabs are pressable by an operator to deflect the portion of the cover located between the tabs for allowing the tabs to enter the openings and thereby secure the cover in a compartment enclosing position with the battery in abutment with the abutment means, said deflected portion of the cover resiliently biasing and pressing the battery securely within the compartment, wherein the cover, abutment means and tabs are formed integral with one another.

* * * * *

UNITED STATES PATENT AND TRADEMARK OFFICE
CERTIFICATE OF CORRECTION

PATENT NO. : 5,228,531
DATED : 20 July 1993
INVENTOR(S) : Jon M. Patterson et al.

It is certified that error appears in the above-indentified patent and that said Letters Patent is hereby corrected as shown below:

Claim 1, Column 3, Line 57, delete "mans" and insert therefor --means--.

Claim 1, Column 3, Line 61, delete "attached" and insert therefor -- a latched --.

Claim 9, Column 5, Line 42, delete "east" and insert therefor --least--.

Claim 9, Column 5, Line 43, delete "pitvotal" and insert therefor --pivital--.

Claim 24, Column 8, Line 5, delete "with" and insert therefor --said--.

Claim 26, Column 9, line 18, delete "therewtih" and insert therefor --therewith--.

Signed and Sealed this

Fifteenth Day of March, 1994

Attest:

BRUCE LEHMAN

Attesting Officer        Commissioner of Patents and Trademarks